Aug. 22, 1967   C. H. WATTS ETAL   3,336,970
METHODS OF CASTING
Filed Feb. 28, 1966   2 Sheets-Sheet 1

INVENTORS
CLAUDE H. WATTS
BY ROBERT A. HORTON
Watts & Fisher
ATTORNEYS

United States Patent Office 3,336,970
Patented Aug. 22, 1967

3,336,970
METHODS OF CASTING
Claude H. Watts, Lyndhurst, and Robert A. Horton, Chesterland, Ohio, assignors to Precision Metalsmiths, Inc.
Filed Feb. 28, 1966, Ser. No. 530,292
13 Claims. (Cl. 164—62)

This application is a continuation-in-part of our copending application, Ser. No. 341,498, filed Jan. 31, 1964, for Ceramic Shell Molds and Methods of Production, and now U.S. Patent No. 3,249,972.

This invention relates generally to the art of investment casing, and more specifically to ceramic shell molding techniques of precision casting wherein shell molds suitable for casting metal are prepared by building up layers of refractory material around disposable patterns which are subsequently removed from the molds and the molds prepared for casting.

In general, ceramic shell molds are prepared using patterns which are replicas of the parts to be cast, including the necessary gates and risers, and which are formed of an expendable material, such as wax or a suitable synthetic resin. These patterns are attached to a sprue member to constitute what is known as a "set-up" or "tree." The formation of a shell mold around the pattern assembly is accomplished by dipping the tree or set-up into a refractory slurry of controlled viscosity followed by directional draining to coat the patterns completely. After draining excess slurry from the tree, the slurry coating is sanded or stuccoed while wet with coarser refractroy particles. The result is a coat of ceramic material having refractory particles embedded in the surface. This coat is hardened, usually by air drying at room conditions.

After the first coat is sufficiently hard and dry, the steps of dripping, draining, stuccoing and drying are repeated until a refractory shell having a sufficient thickness to resist the stresses occurring in subsequent operations has been built up around the tree. The usual shell thickness is from about ⅛ inch to about ½ inch, although thicker or thinner shells may be formed for special situations. The disposable patterns are then removed from the shell mold and the mold prepared for the casting operation.

Prior to the invention disclosed in copending application Ser. No. 341,498, ceramic shell molds were produced as one-piece constructions. There are many problems encountered in processing conventional one-piece shell molds, and one of the more serious of these problems is that of destroying the patterns without cracking the relatively thin walls of the molds. Depending upon the particular type of pattern material, many different pattern removal operations have been developed and employed in the past in attempts to avoid mold cracking due to detrimental pressures created by the pattern material in the mold cavities. None of these operations were completely successful for all pattern sizes, shapes and materials.

The invention disclosed in copending application Ser. No. 341,498 provides substantial advantages and improvements in all phases of ceramic shell molding operations, including the removal of the patterns. In accordance with the preferred process of that invention, a refractory shell it built up around a tree and the tree is subsequently destroyed to provide an open-end cylindrical passage through the shell and a plurality of pattern cavities gated into the passage. A core is then assembled in the shell passage to define a tubular sprue passage of a size sufficient to feed the cavities.

Because of the through passage in the shell, the pattern removal operation can be performed without cracking the shell and in a shorter time than in the past. For example, when the patterns are formed of a heat expendable material, the shell can be quickly heated both internally and externally. The internal heating of the shell affords almost instantaneous relief on the inside of the shell for each pattern cavity and thus prevents cracking pressures from being developed. Another feature of that invention is that the novel mold structure has all of the advantages of a tubular sprue passageway disclosed in U.S. Patent No. 3,015,138. These advantages include directional solidification, a low ratio of gating metal to casting metal, and improved metallurgical characteristics of the castings.

The present invention provides a novel technique for casting a multi-part mold wherein separate parts of the mold define a casting space and must be maintained in a fixed relative position wherein the space is filled with metal or other material. The invention is particularly concerned with a new technique for casting the above-described mold structure comprised of a refractory shell and a core assembled in the shell.

In the practice of the preferred method contemplated by the invention, the core can be positioned as a separate member within the shell just prior to casting and the resulting mold assembly can be filled with metal without first physically connecting the shell and core to form a unitary mold unit. Important advantages and economies are obtained by eliminating connecting structure, such as a refractory base integrally joining the shell and core, which had sometimes been used to close-off one end of the sprue passageway and to prevent the core from "floating" when molten metal was introduced into the mold.

When the shell and the core were pre-assembled to form an integral mold unit, it was necessary when using patterns formed of wax or other heat expendable material to follow the procedure of first heating the shell to melt out the patterns, then cooling the shell to facilitate the integral connection of the core, and finally reheating the connected members just prior to the casting operation. Since the present invention makes it possible to process the mold assembly without integrally connecting the shell and core together, it is not necessary to cool the shell after the pattern removal operation. The heating of the mold completely to remove the patterns and the preheating for casting can be combined into one operation, thereby reducing the time required and the amount of furnace space needed.

An integral assembly of the shell and the core made it desirable to form both members of compatible materials having matching coefficients of thermal expansion. It usually was not feasible to use completely different materials for the core and the mold. The present invention avoids this limitation and permits a great latitude in the choice of core materials. Substantially any material suitable for metal casting can be used and the cores can be produced by any ceramic or foundry molding process that results in the required shape. In particular, it is possible to use less expensive materials for the core and even materials that would be entirely unsuitable for use in the shell itself.

Since the present invention does not require the shell and the core to be physically connected together, the two members can be heated to different temperatures prior to casting in order to obtain certain beneficial results. For example, the core can be heated so that it is hotter than the shell in order to improve still further the outstanding ability of the tubular sprue gating system to promote directional solidification of the cast metal. In other situations, the core can be at a lower temperature than the shell or even at room temperature. This makes it possible successfully to use resin-bonded sand cores at temperatures as low as room temperature and as high as 500° F. in ceramic shells that have been preheated as high as 2000° F. While the lower temperature of the core sacrifices some of the feeding capability of the tubular sprue passageway, the decrease in feeding capability can be compensated for by a small increase in the size of the sprue passageway. The cost of the additional metal required is more than off-set by the lower cost of resin-bonded cores compared to refractory cores. An added advantage of resin-bonded cores is that they disintegrate during cooling. This disintegration of the core facilitates knock-out and clean-up of the castings and aids in recovery of the material used in the core.

Another advantage of enabling the shell and the core to be processed separately is that the weight of the mold which has to be handled at any one time by the operator is materially reduced. Consequently, the size of the shells which can be handled manually is increased. Still other advantages include the elimination of the time, labor, materials and equipment that were required to form the refractory base between the core and the shell.

The technique contemplated by the invention for holding the core as a separate member within the shell during the casting operation includes the steps of placing the shell and core on a support and creating a differential gas pressure on the core to maintain it in position. Preferably, a vacuum is drawn around the shell and within the core to create the differential pressure. The level of the vacuum is made sufficient to hold the two members in place when the metal is poured and to achieve other advantages more specifically described below.

While it is possible to hold the shell and core in place mechanically instead of utilizing a vacuum system, the use of a vacuum system is preferred, since it is less cumbersome and can be utilized simply and inexpensively. Furthermore, the vacuum which is produced around the permeable refractory shell has the advantageous effect of promoting a complete fill of any thin sections of the mold cavities by the molten metal. When resin-bonded cores or the like are used, the vacuum within the core serves to draw off the vapors which occur during casting.

When the core is made of investment-type material or ceramic shell material, its permeability is usually low enough so that an adequate pressure reduction can be readily obtained in the core and around the mold with a vacuum system of relatively low capacity. In some instances, however, such as when a resin-bonded sand core is used, the core may be extremely permeable relative to the shell so that it is difficult to obtain an adequate level of the vacuum within the core and around the shell. This invention provides a novel procedure for adjusting the vacuum within the core so that it is sufficient to hold the core in place but is less than the vacuum around the shell. With this preferred procedure, it is possible even with a vacuum system of relatively low capacity to maintain the shell and a more permeable core in place so that the mold assembly can be satisfactorily cast.

Other advantages and a fuller understanding of the invention will be had by reference to the following detailed description and the accompanying drawings.

Figure 1:
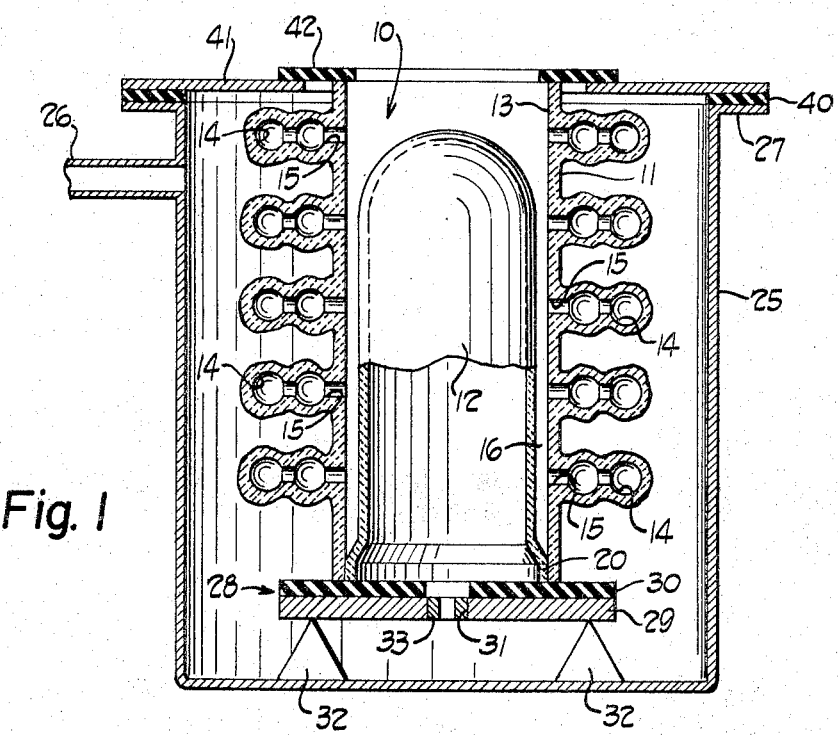
FIGURE 1 is a schematic, vertical cross-sectional view showing an apparatus for carrying out the method of this invention.

Referring now to the drawings, and to FIG. 1 in particular, reference numeral 10 generally designates a multipart mold assembly comprised of an outer refractory body or shell 11 and a separate core 12 disposed within the shell.

The shell 11 has an inner surface 13 that defines a cylindrical passage open at both ends and a plurality of pattern cavities 14 which are gated at 15 into the passage.

The core 12 is positioned within the shell 11 in spaced relation to the inner surface 13 so as to define a tubular sprue passageway 16. As shown, the core 12 is a hollow member having a closed end and an open end. The closed end is at substantially the same height at the top row of pattern cavities in the shell and cooperates with the top portion of the shell to define a pouring cup. Preferably, the core 12 is formed with a peripheral rim or step 20 around its lower, open end. The rim or step 20 serves to center the core within the shell and substantially fills the lower end of the sprue passageway 16 so that little or no molten metal can squeeze past the core when the mold is cast.

In accordance with the procedures more fully disclosed in copending application Ser. No. 341,498, the shell 11 may be formed by use of a pattern assembly (not shown) including a cylindrical center tree or sprue member closed at both ends and a plurality of patterns extending from and attached to the outside surface of the center tree. The pattern assembly is coated a desired number of times with a refractory slurry which may consist essentially of a suspension of a fine refractory powder, such as zircon (zirconium silicate) and fused silica, in a binder solution comprised mainly of colloidal silica sol and small amounts of an organic film former, a wetting agent, and a defoaming agent. After each application of the slurry, the assembly is directionally drained to remove excess slurry and the wet slurry coating is stuccoed with coarser refractory particles. Suitable refractory materials employed for stuccoing include granular zircon, fused silica, silica, various aluminum silicate grogs including mullite, sillimanite, fused alumina, tabular alumina and similar materials. Each stuccoed coating is then hardened, as by forced air drying, to form a refractory layer around the pattern assembly. This sequence of operations is repeated as many times as is necessary to build up a shell 11 having the thickness and strength required for the particular casting operation. The usual wall thickness of the shell 11 is on the order of from about ⅛ of an inch to about ¼ of an inch.

After formation of the shell 11, the pattern assembly is removed from the mold in a suitable manner. When the patterns are formed of wax or other heat expendable material, the patterns may be removed by placing the shell 11 into an autoclave or a furnace operated at a suitable temperature.

As previously discussed, the core 12 can be formed from any material suitable for casting metal and by different techniques. By way of example, a refractory core can be formed by coating a disposable wax form with the same refractory slurry used to make the shell 11. Refractory cores also can be made by preparing a slurry mix and casting it into a suitable mold. According to another technique, the core 12 can be a resin-bonded sand formation produced by the well-known Croning shell molding process.

The illustrated apparatus which can be used to carry out the preferred method of this invention is comprised of a vacuum and casting chamber 25. As shown, the vacuum and casting chamber 25 is provided with an outlet pipe 26 which is connected through a suitable valve (not shown) to a vacuum pump or line. A platform 28 is provided within the chamber 25 for supporting the mold assembly 10. The platform 28 may be comprised of a metal plate 29 on which is disposed a gasket 30. The gasket 30 should be soft enough so that a tight seal can be obtained between the mold assembly 10 and the plate 29 and yet dense or hard enough to stop any molten metal that may flow between the rim 20 of the core 12 and the inside surface 13 of the shell 11. Suitable gaskets have been formed from asbestos pads, insulation or blankets formed of refractory fibers, such as alumina-silica fibers, and the like. A hole 31 is formed through the plate 29 and the gasket 30, and the plate is supported above the bottom of the chamber 25 by suitable supports 32. For reasons to be more fully discussed, it may be desirable to vary the effective size of the hole 31. To this end, an annular plug 33 having the desired inner diameter can be fitted into the hole 31.

In use, the open end of the core 12 is placed on the gasket 30 over the hole 31 and the shell 11 is positioned on the gasket around the rim 20 of the core. A gasket 40 which can be made of rubber, asbestos or other similar material is placed on a rim 27 of the chamber 25 and a metal plate 41 is positioned over the gasket. The plate 41 has an opening which is preferably slightly larger than the outside diameter of the top portion of the shell 11. The height of the supports 32 is preferably adjustable so that the shell 11 can be positioned to extend a slight distance above the level of the plate 41. The illustrated apparatus is completed by an asbestos gasket 42 or the like which has an opening smaller than the inside diameter of the shell 11 but which is large enough to pour metal through. This gasket 42 is placed on the plate 41 so that it covers the top edge of the shell 11.

When the mold assembly 10 has been positioned in the manner described, a vacuum is drawn within the chamber 25 around the shell 11. At the same time, a vacuum is also produced within the core 12 because of the hole 31 which provides communication between the inside of the chamber 25 and the inside of the core. The resulting pressure differential on both the shell and the core serves to hold the members in their assembled position tight against the gasket 30. This pressure differential is maintained during pouring of the mold to prevent relative movement of the core and shell. The degree of vacuum which has been found sufficient to cast the mold successfully is usually in the range of from 1 to 15 inches of mercury below atmospheric pressure. During casting, the rim or step 20 on the core 12 prevents any significant amount of molten metal from penetrating between the core and the inner wall of the shell 11. The height of the rim or step is sufficient so that whatever metal does enter this annular space solidifies without causing either the shell or the core to "float."

As previously discussed, a sufficient vacuum can be obtained within the core and round the shell with a low capacity vacuum system when the two members are made of a relatively low permeability investment type material or ceramic shell material. However, when the core is a resin-bonded sand formation or other relatively permeable material, considerable difficulty may be encountered in achieving the required degree of vacuum because of the large amount of air that can pass through the core. It is possible, of course, to increase the pumping capacity of the vacuum system; however, this requires additional expense.

For a vacuum system of any given capacity, small increases in the degree of vacuum produced within the core can be obtained by heating it. Since the viscosity of air increases with temperature, the rate of flow through a heated permeable core will be reduced. This reduction of air flow and the resulting increase in the level of vacuum may be sufficient to hold the shell and core in place when starting to pour molten metal into the mold 10. As the molten metal fills the mold and progressively covers the core, the area for air flow through the core is reduced and the vacuum capability of the system is correspondingly increased.

A preferred and more satisfactory and useful technique is based on the discovery that it is possible to achieve varying degrees of vacuum inside the core in relation to the vacuum level in the chamber 25 by varying the effective size of the hole 31 through the plate 29 and the gasket 30. For example, if there were no hole through the plate and gasket, a large pressure reduction would be obtained around the shell and no vacuum would be produced within the core. With a very large hole through the plate 29 and gasket 30, the vacuum within the core and the chamber 25 will tend to equalize, but will be relatively small because of the large leakage through the porous core. Between these two extremes of hole size, there is a range in which the distribution of vacuum between the inside of the core and the inside of the chamber 25 can be widely varied simply by suitably adjusting the size of the hole 31. As the hole size is increased for a given system with a fixed pumping capacity, the vacuum in the chamber 25 becomes smaller while that inside the core 12 increases. This distribution of the vacuum may tend to level off or even pass through a maximum within the core as the hole size becomes sufficiently large.

Figure 2:
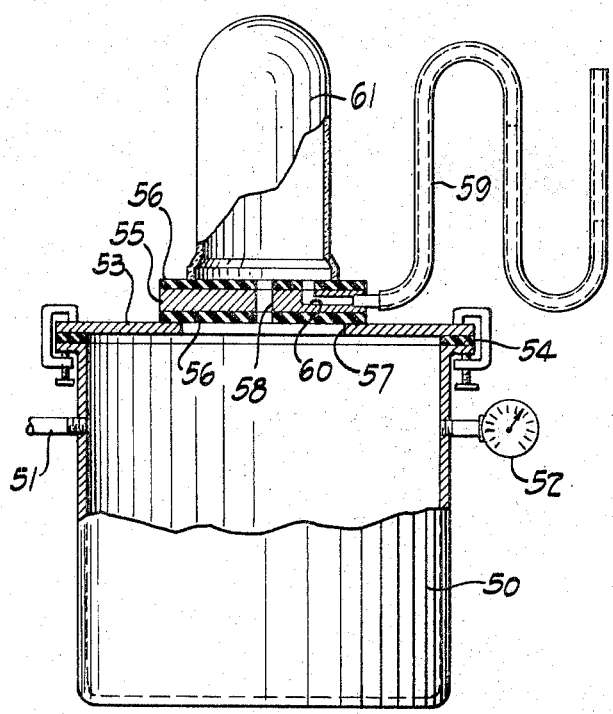
FIGURE 2 is a schematic, vertical cross-sectional view illustrating a testing apparatus for determining the distribution of vacuum around the shell and within the core.

In order to demonstrate how the distribution of vacuum between the inside of the core and the inside of the vacuum chamber can be varied by changing the size of the hole 31, a series of tests were conducted using the experimental apparatus illustrated in FIG. 2. This apparatus was comprised of a vacuum chamber 50 which was connected through a pipe 51 to a multi-station vacuum line. This vacuum line was in turn connected through a storage tank to two sixty cubic feet per minute pumps. A vacuum gauge 52 was connected to the chamber 50 in order to measure the vacuum created in the chamber.

The experimental apparatus further included an annular metal plate 53 which was clamped to the top of the chamber 50 and sealed against leakage by a rubber sealing gasket 54. An assembly comprised of a metal plate 55 disposed between two refractory felt gaskets 56 was placed over the opening 57 of the plate 53. The assembly 55, 56 had nine through holes 58 (only one of which is shown) having different diameters. A manometer or vacuum gauge 59 was connected through a duct 60 of the plate 53 to the interior of a core 61.

The core 61 was placed in an inverted position on the upper felt gasket 56 and all but one of the holes 58 was plugged. The core was mounted on top of the chamber simply for convenience in changing the cores and hole sizes and in order to facilitate measuring the vacuum inside the core. Nevertheless, this arrangement simulates the casting arrangement described in connection with FIG. 1 in that the interior of the core is connected through a hole in a plate to a casting chamber in which a partial vacuum is drawn, the outer surface of the core being in contact with the atmosphere.

A first series of tests was conducted using a ceramic shell core. This core was made by coating a hollow aluminum mandrel with a thin layer of low melting point wax, building up a refractory coating over the mandrel by alternately dipping it into a refractory slurry, stuccoing the coating with coarser refractory particles, and drying. After the core was completed and dried, hot water was poured into the interior of the aluminum mandrel to melt the wax and release the core which was then fired to 2000° F. and cooled to room temperature for testing. The results of the tests conducted using this core are plotted in the graph of FIG. 3. As will be apparent from this graph, there was only a small decrease in the vacuum obtained in the chamber 50 when the effective size of the hole 58 was increased from $\frac{1}{16}$ of an inch to $1\frac{1}{4}$ inch. The vacuum within the core, on the other hand, increased very rapidly as the hole size was increased up to about $\frac{3}{8}$ inch.

Figure 4:
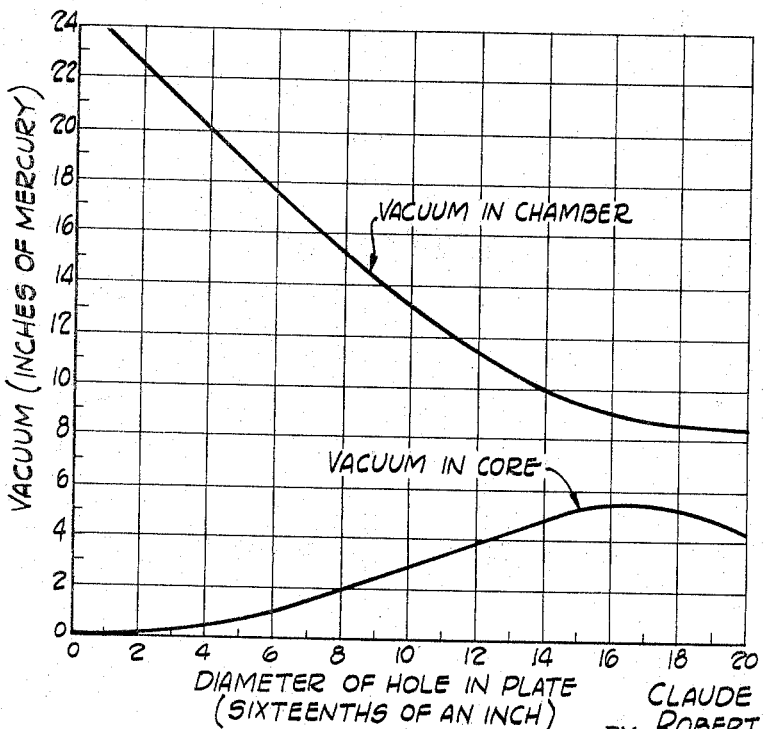

Another series of tests were conducted using a relatively permeable, resin-bonded sand core, and these tests are plotted in the graph of FIG. 4. With the more permeable resin-bonded sand core, the vacuum in the chamber 50 dropped rapidly as the size of the hole 58 communicating with the inside of the core was increased. With a $1\frac{1}{4}$ inch diameter hole size, the vacuum in the chamber was less than $\frac{1}{3}$ of the value for a $\frac{1}{16}$ hole size. The corresponding vacuum in the permeable resin-bonded sand core increased with an increase in hole size, although not as rapidly as for the refractory ceramic core. It will be seen that the vacuum in the resin-bonded sand core passed through a maximum with a one-inch hole size.

Figure 3:
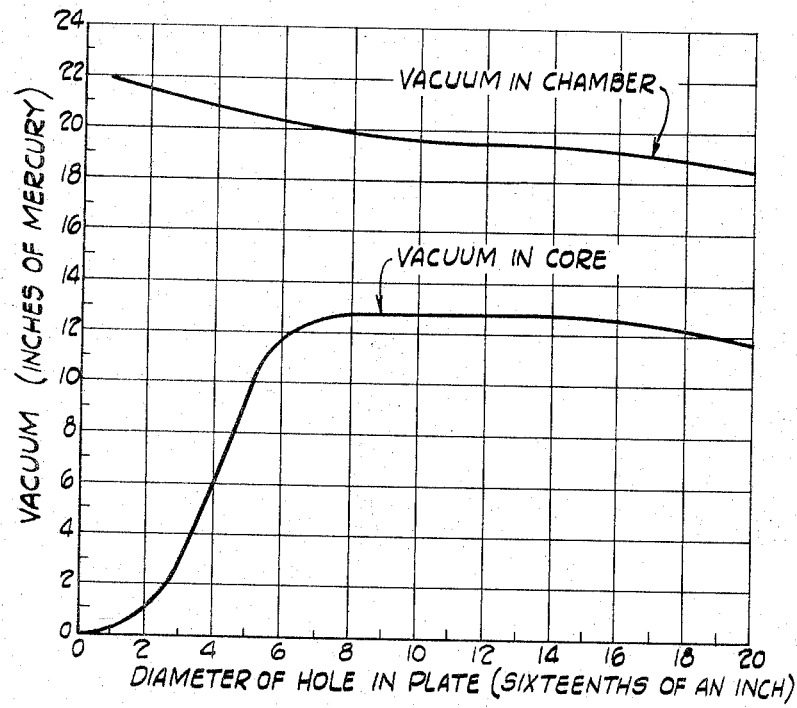
FIGURE 3 is a graph showing test results obtained by use of the apparatus illustrated in FIG. 2; and, FIGURE 4 is a graph showing results obtained in another test conducted with the apparatus illustrated in FIG. 2.

The results plotted in the graphs of FIGS. 3 and 4 illustrate how, for a given vacuum system, the degree of vacuum can be varied between the chamber 25 and the interior of the mold core in order to produce optimum conditions for casting. These results have been verified on production size casting tests and have proven extremely useful in adapting the process of this invention to existing vacuum equipment.

*Example I*

A seven-dip ceramic shell was formed according to the procedures previously described. The shell was cylindrical in shape and had an inside diameter measuring 12⅝ inches. The mold was 16 inches high and contained 595 pattern cavities of a small commercial part.

A core was made by conventional resin shell molding techniques using a zircon sand coated with 1.5% resin. The resin coated zircon sand is commercially available from Acme Resin Corp. and is designated "Plastisand" ZR 1.5–76. The core was 15 inches high and had an outside diameter of 12⅛ inches, thus providing for a ¼ inch sprue passageway when positioned in the mold shell. The peripheral rim or step around the open end of the core measured ¾ inch high by ¼ inch.

In setting up the apparatus illustrated in FIG. 1, a ¼ inch thick gasket formed of alumina-silica ceramic fiber felt supplied by Johns-Manville Co. under the trade name "Cerafelt 1400" was placed on top of a ¾ inch steel plate 29. The plate 29 and the gasket 30 has a central hole 31 measuring 1 inch in diameter. The resin-bonded core at room temperature was centered over the hole in the gasket 30 and the cylindrical shell 11 which had been preheated to about 2000° F., was placed around the core. A partial vacuum of three inches of mercury below atmospheric pressure was drawn in the chamber 25 and 109 pounds of 416 stainless steel at 2975° F. were cast into the mold. The vacuum was turned off as soon as the mold was full.

It was found that there was no leakage of metal from the mold whatsoever. The resulting castings were sound and were comparable to those made using conventional investment casting techniques and molds.

*Example II*

When a resin-bonded core is used, it is sometimes desirable to coat the core with a thin film of mold wash or other material. Depending upon the particular combination of conditions under which a mold is cast, such as temperatures of the shell, core and metal, the elapsed time between assembly of the core within the hot shell and pouring of the metal, the pouring rate, mold size, and the like, occasional castings may show defects due to refractory particles and/or gas resulting from the partial disintegration of the resin-bonded core surface. This disintegration is due to the combined heat of the metal and the hot shell, and can be prevented by the simple application of a suitable mold wash to the outer surface of the core.

In this example, a core 8½ inches in diameter and 15½ inches high was made in the manner described in Example I. This core was coated by dipping it once in a dip-coat slurry which contained a mixture of fused silica and zircon powders in a colloidal silica sol vehicle plus small amounts of a wetting agent, a defoaming agent and an organic film-forming resin. The viscosity of the slurry was adjusted to about 400 cps. to produce a very thin coating on the core. The core was oven-dried to drive off the water from the coating.

A six coat cylindrical ceramic shell having 592 pattern cavities was made by conventional techniques. The shell measured 8⅝ inches in outside diameter and was 16 inches high. The core was at room temperature and the shell was pre-heated to 2000° F. and placed around the core in the apparatus of FIG. 1. A vacuum of six inches mercury below atmospheric pressure was drawn in the casting chamber and 82 pounds of 6150 low alloy steel at 3000° F. were cast into the mold assembly. The vacuum was turned off as soon as pouring was complete. It was found that there was no leakage between the core and the mold shell and that the castings were sound and comparable to conventional investment castings in all respects.

*Summary*

It will be apparent from the foregoing detailed description that the invention provides new techniques suitable for holding a separate core within a mold shell for a casting operation. With the method and apparatus of this invention, it is not necessary physically to connect the core to the shell, as by use of an integrally united base, so that the core and the shell can be formed of different materials. It is also possible to heat the core and shell to different temperatures in order to promote directional solidification of the mast metal and to obtain other beneficial results. Other advantages pointed out above include the ability to remove the patterns from the shell and preheat it for casting in one operation, and the elimination of the labor, time and material which were required to form a unitary core and shell assembly.

Many modifications and variations of the invention will be apparent to those skilled in the art in the light of the foregoing detailed disclosure. Therefore, it is to be understood that, within the scope of the appended claims, the invention can be practiced otherwise than as specifically shown and described.

What is claimed is:

1. In the casting of a refractory mold including a mold body and a core, the method comprising the steps of positioning the mold body on a support, positioning the core in the mold body to define a casting space for receiving the material to be cast, reducing the pressure on a portion of the core to a level below that of the pressure in the casting space and thereby creating a differential gas pressure on the core to hold it in position, and casting the mold while maintaining said differential gas pressure to prevent movement of the core.

2. The method of casting comprising the steps of:
  (a) forming a mold body,
  (b) forming a core,
  (c) placing said mold body on a support,
  (d) positioning said core in association with said mold body to define a casting space for receiving material to be cast,
  (e) reducing pressure within said core to a level below that of said casting space and thereby creating a differential gas pressure on said core to hold it in a fixed position, and
  (f) casting material into said space while maintaining said differential pressure to prevent movement of said core.

3. The method as claimed in claim 2 including the steps of:
  (g) reducing the pressure around the outside of said mold body to a level below that of said casting space and thereby creating a differential gas pressure on said mold body, and
  (h) maintaining the reduced pressure around the outside of said mold body during the casting step.

4. The method as claimed in claim 3 wherein the step of reducing the pressure around the outside of said mold body comprises placing said mold body in a vacuum chamber, and drawing a partial vacuum in said chamber around said mold body while maintaining said casting space at a higher pressure than that in said chamber.

5. The method as claimed in claim 4 wherein said step of reducing the pressure within said core comprises positioning said core over an opening through said support, said opening communicating with said chamber so that the portion of the core over said opening is exposed to a partial vacuum and another portion of said core defining said casting space is exposed to said higher pressure.

6. The method as claimed in claim 5 including the step of adjusting the size of said opening to obtain a different differential pressure on said core than on said mold body.

7. The method of casting comprising the steps of:
 (a) forming a casting mold body member having a through open-ended passage and a plurality of pattern cavities gated into said passage, said body member being formed of a gas permeable refractory material,
 (b) forming a hollow core member,
 (c) placing said core and body members on a support and assembling said core member within said passage to form a sprue passageway,
 (d) reducing the pressure in said hollow core member to a level below that in said sprue passageway and thereby creating a differential gas pressure on said core member to hold it against said support, and
 (e) casting metal into said sprue passageway while maintaining said differential gas pressure to prevent movement of said core member.

8. The method as claimed in claim 7 including the steps of:
 (f) drawing a vacuum around said mold body member, and
 (g) maintaining said vacuum during said casting step.

9. The method as claimed in claim 8 including the step of heating at least one of said members prior to said casting step.

10. The method as claimed in claim 9 wherein said members are at different temperatures when said casting step is initiated.

11. The method as claimed in claim 8 wherein said differential pressure on said core member is created by exposing the inside of said core member to the vacuum around said body member.

12. The method as claimed in claim 11 including the step of adjusting the pressure inside said core member so that it is higher than the pressure around said body member.

13. The method of casting comprising the steps of:
 (a) forming a refractory mold body having a through passage and a plurality of pattern cavities gated into said passage,
 (b) forming a hollow core having an open end and a closed end,
 (c) positioning said core within said passage of said mold body to form a tubular sprue passageway, said closed end of said core being disposed at one end of said through passageway and said open end of said core being disposed at the opposite end of said sprue passageway,
 (d) placing said mold body and a core on a support within a vacuum chamber so that said one end of said sprue passageway is exposed to atmospheric pressure,
 (e) reducing the pressure around said mold body and within said core to a level below that of said sprue passageway, and
 (f) casting molten metal into said one end of said sprue passageway while maintaining the reduced pressure around said mold body and within said core.

References Cited

UNITED STATES PATENTS 2,314,839  3/1943  Campbell _____ 22—200
2,379,401  6/1945  Poulter _____ 22—200 X J. SPENCER OVERHOLSER, *Primary Examiner.*

E. MAR, *Assistant Examiner.*

UNITED STATES PATENT OFFICE
CERTIFICATE OF CORRECTION

Patent No. 3,336,970                      August 22, 1967

Claude H. Watts et al.

It is hereby certified that error appears in the above numbered patent requiring correction and that the said Letters Patent should read as corrected below.

Column 1, line 14, for "casing" read -- casting --; line 31, for "refractroy" read -- refractory --; line 36, for "dripping" read -- dipping --; column 4, line 8, for "at", second occurrence, read -- as --; column 5, line 44, for "round" read -- around --; column 7, line 72, for "5/6" read -- 5/8 --; column 8, line 19, for "mast" read -- cast --.

Signed and sealed this 20th day of August 1968.

(SEAL)
Attest:

Edward M. Fletcher, Jr.                      EDWARD J. BRENNER

Attesting Officer                            Commissioner of Patents